J. J. MULHALL.
WATER AND GAS METER.
APPLICATION FILED SEPT. 23, 1910.
995,278.
Patented June 13, 1911.
4 SHEETS—SHEET 1.
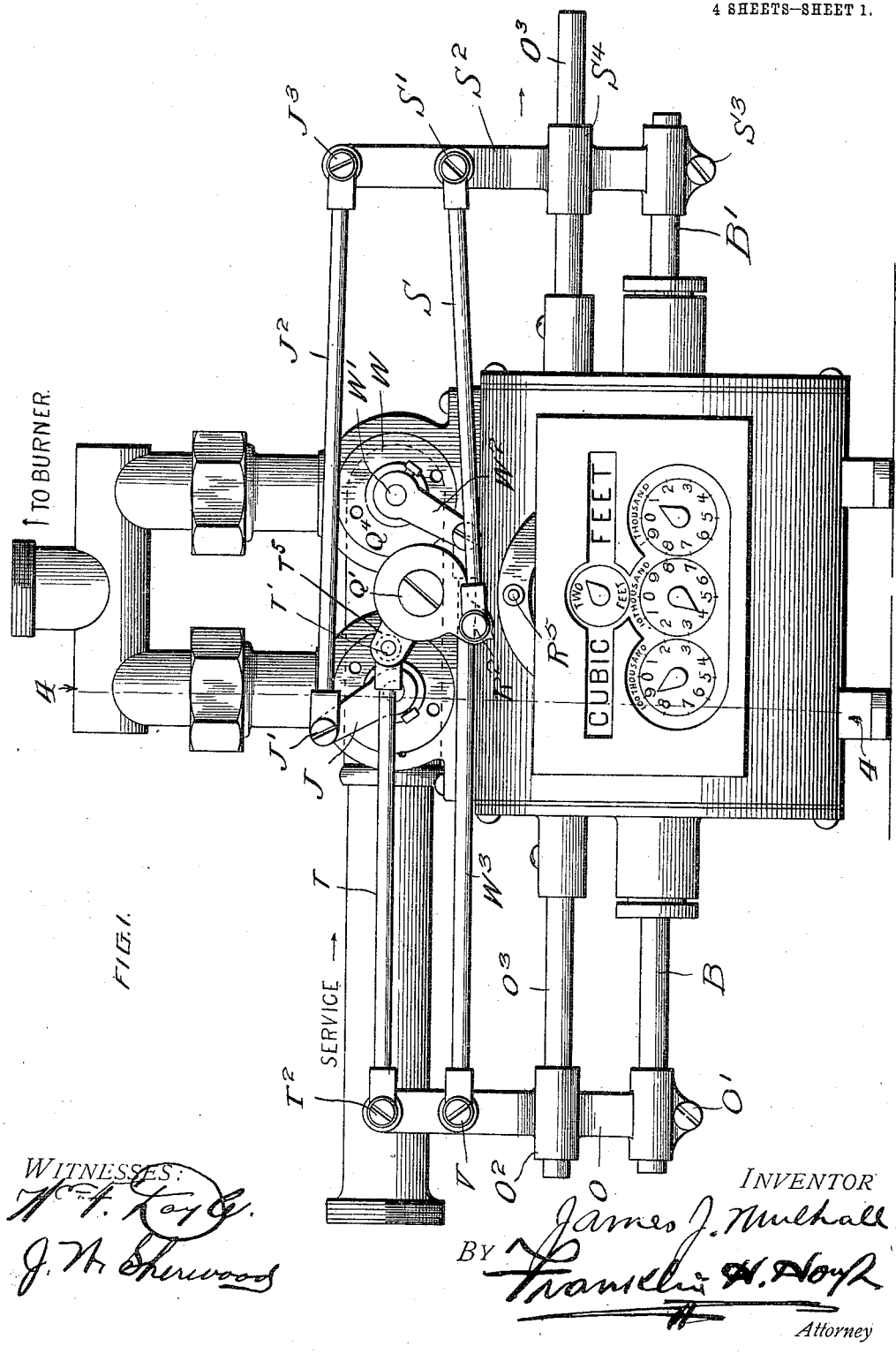

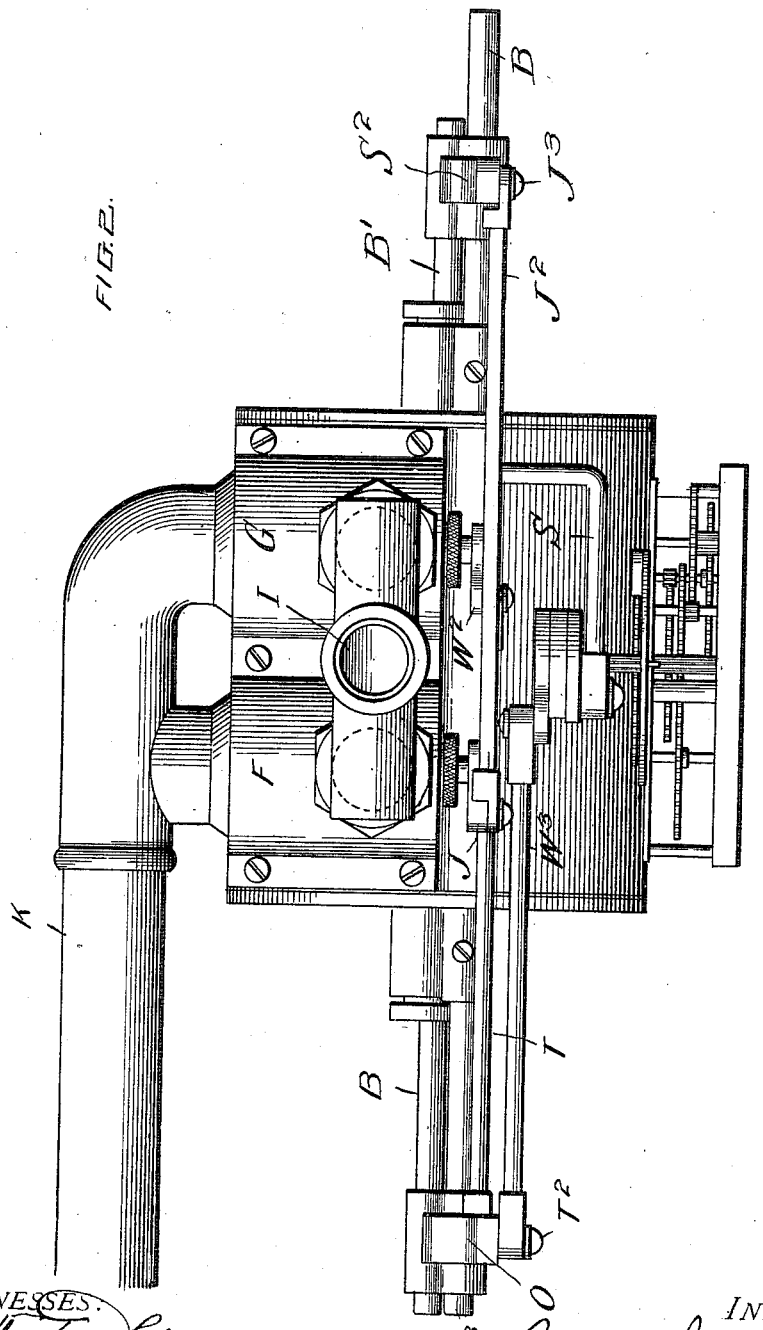

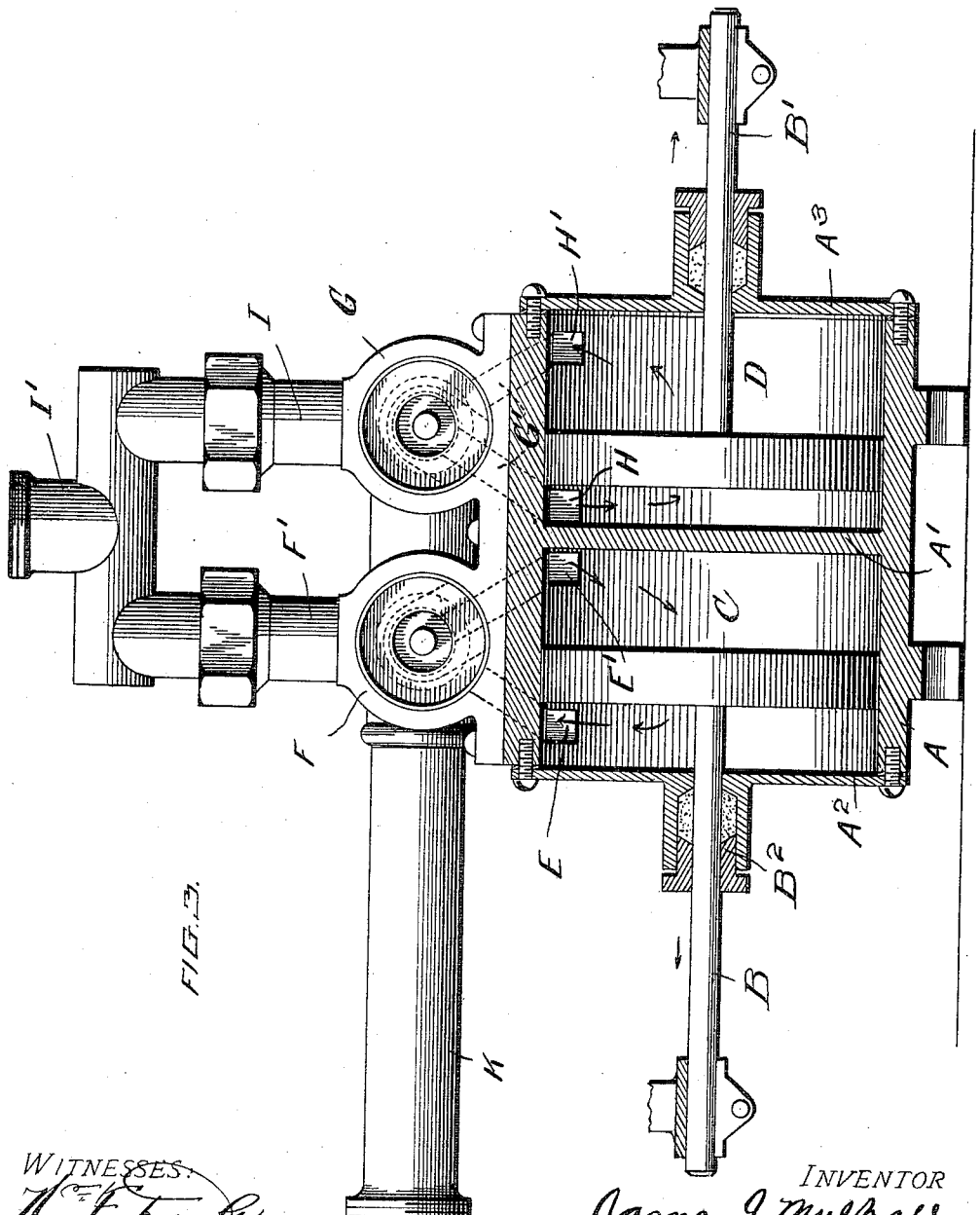

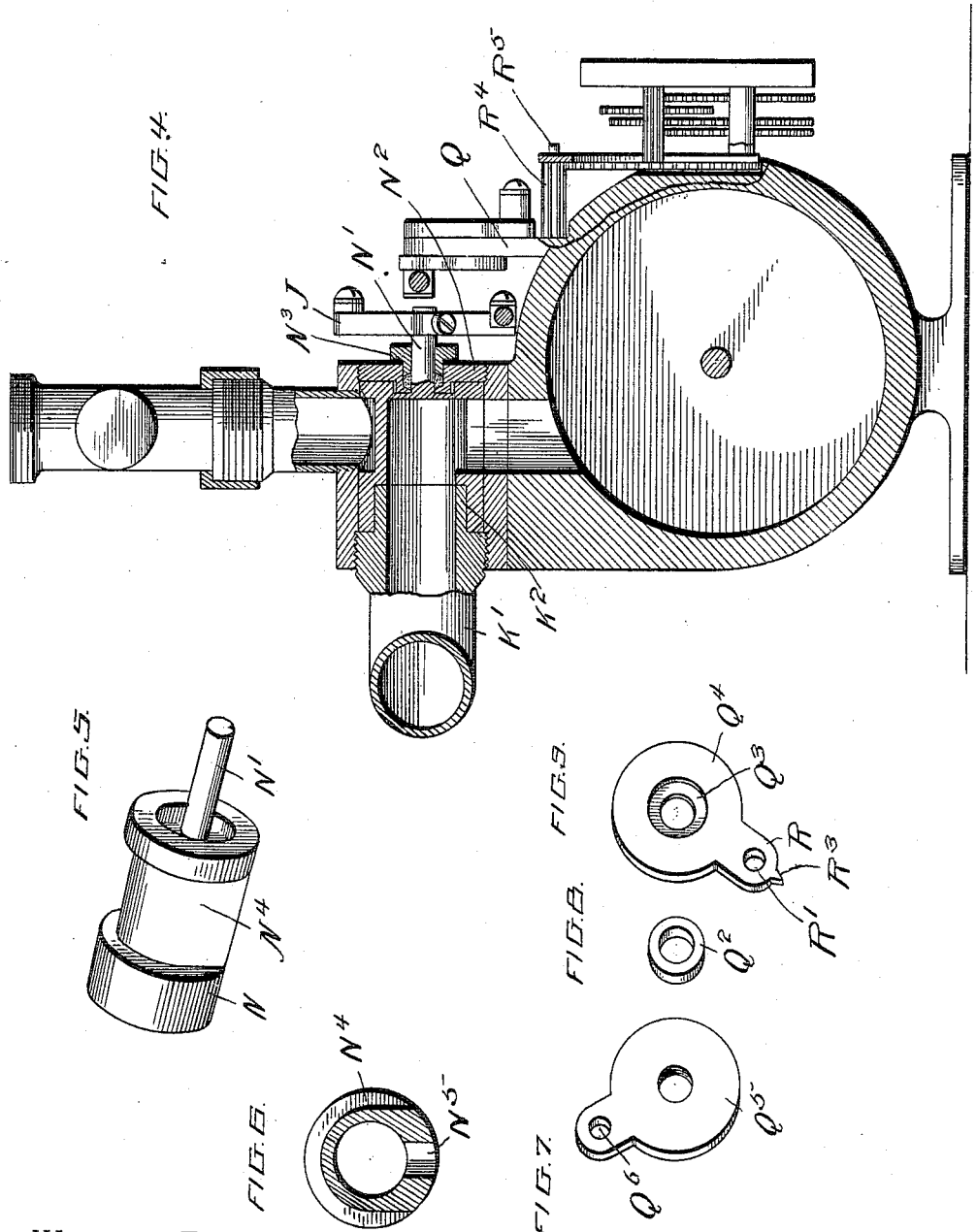

UNITED STATES PATENT OFFICE.

JAMES J. MULHALL, OF ALBANY, NEW YORK.

WATER AND GAS METER.

995,278.   Specification of Letters Patent.   Patented June 13, 1911.

Application filed September 23, 1910. Serial No. 583,478.

*To all whom it may concern:*

Be it known that I, JAMES J. MULHALL, a citizen of the United States, residing at Albany, in the county of Albany and State of New York, have invented certain new and useful Improvements in Water and Gas Meters; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in gas, water or other meters and the object in view, is to produce a simple and efficient device of this nature as to form a meter which will register accurately, and so arranged that no sediment will locate in the meter and affect in any way the operation of the apparatus.

The invention consists further in the provision of a water and gas meter in which the usual bellows commonly employed in various meters may be dispensed with, and in the provision of gear mechanism whereby dead centers may be overcome.

The invention consists of various other details of construction and combinations and arrangements of parts which will be hereinafter fully described and then specifically defined in the appended claims.

I illustrate my invention in the accompanying drawings, in which:—

Figure 1 is a side elevation of my improved meter. Fig. 2 is a top plan view of the meter. Fig. 3 is a longitudinal sectional view through the center of the cylinder of the meter and showing in elevation the parts connected therewith. Fig. 4 is a transverse sectional view through the cylinder and parts connected therewith and taken on line 4—4 of Fig. 1. Fig. 5 is a detail perspective view of a cut-off valve. Fig. 6 is a detail transverse sectional view through the cut-off valve shown in Fig. 5. Figs. 7, 8, and 9 are detail views of parts of the invention.

Reference now being had to the details of the drawings, by letter, A designates a cylinder having a central partition $A'$ therein and removable ends $A^2$ and $A^3$ which are centrally apertured for the reception of the piston stems B and $B'$ respectively, said piston stems passing through suitable packed glands $B^2$. Fixed to the inner end of the piston stem B is a piston C, and to the inner end of the piston $B'$ is a piston D. Opening into the compartment in which the piston C is located are the ports designated by letters E and $E'$ which communicate with the interior of the valve casing F, with which latter a discharge or exhaust pipe $F'$ communicates, and which may lead to any suitable location. A similar valve casing designated by G, has ducts $G'$ leading therefrom one of which opens through a port H into one end of the compartment of the cylinder in which the piston D is mounted, and the other through a port $H'$ opening into the other end of the compartment in which the piston D is mounted, said ports in both compartments of the cylinder being positioned preferably near the ends of their respective compartments. A discharge or exhaust pipe I is connected with the valve casing G and also with a pipe $I'$ which also connects with the pipe $F'$.

A service pipe designated by letter K connects with each of the valve casings F and G, at corresponding ends thereof. It will be noted upon referring to Fig. 4 of the drawings that the pipe $K'$ has its inner end $K^2$ slightly contracted and over which the inner end of the valve N is adapted to telescope and rock. A detail perspective view of said valve N shown in Fig. 5 of the drawings as being hollow is provided with a stem $N'$ which projects through the removable end $N^2$ of the valve casing, which end $N^2$ has threaded connections with threads upon the inner surface of the valve casing. Said stem $N'$ passes through a suitable packed gland $N^3$ which is fitted within the removable end $N^2$ as shown clearly in Fig. 4 of the drawings. It will be noted upon reference to Figs. 5 and 6 of the drawings, that the valve N is provided with a circumferential recess $N^4$ and has a single port $N^5$ opening through its circumference into its interior which port $N^5$ is adapted to register with one or the other of the ducts E and $E'$ according as the valve is rocked in one direction or the other, as may be desired to cause the fluid to be introduced into the cylinder upon one side or the other of the piston C.

It will be understood that the mechanism of the cut off valve shown in Fig. 5 of the drawings and as above described, is similar in construction to the valve mounted in the casing G and operates in identically the same manner and that the valves operate in alternate relation one with the other.

Fixed to the stem B of the piston C is a guide bar O which is adjustably held upon said stem by means of a screw O'. Said guide bar has a boss $O^2$ integral therewith, which is provided with an opening to receive the guide pin $O^3$ fixed to the end of the cylinder as shown clearly in Fig. 1 of the drawings. Said cylinder has a projection Q rising therefrom, which is apertured for the reception of a screw Q', which screw passes through a ring $Q^2$, a detail of which is shown in Fig. 8 of the drawings and which ring is seated in an annular recess $Q^3$ formed in the disk crank designated by $Q^4$ a detail of which is shown in Fig. 9 of the drawings. Said screw passes through a similar disk crank designated by $Q^5$, the two members $Q^4$ and $Q^5$ being adapted to rotate with the screw, a detail of said disk crank $Q^5$ being illustrated in Fig. 7 of the drawings. It will be noted that the aperture in the disk crank designated by $Q^5$ is interiorly threaded to receive the threaded end of said screw while the head of the screw is adapted to engage the face of the disk crank $Q^4$. The crank R of the disk $Q^4$ is apertured as at R' for the reception of a pivotal screw or pin $R^2$ and a tooth $R^3$ is formed integral with the crank R and is adapted to mesh with the teeth of the pinion cylinder $R^4$ which is journaled upon a shaft $R^5$. Said pinion cylinder is adapted to impart an intermittent movement to the meter register mechanism illustrated in Figs. 1 and 4 of the drawings but which latter does not form any part of the present invention, hence no further detailed description of the same is deemed necessary.

S designates a crank rod which is pivoted to one end of the screw $R^2$ and the other end is pivotally connected to a screw S' which is mounted upon a guide bar $S^2$ similar to the guide bar O, before described, and which latter is fixed to the piston stem B' by means of a screw $S^3$, said guide bar $S^2$ having an apertured boss $S^4$ through which the stem B' is adapted to rock. A second crank rod designated by letter T has its inner end pivotally connected to a pin T' which is fastened to a crank $T^5$ upon the disk $Q^5$. The other end of the crank rod T is connected to a pivoted pin $T^2$ which is carried by the guide bar O.

Fixed to the stem of the cut off valve N is a crank J carrying a pivoted pin J' and $J^2$ designates a rod which is pivotally connected to said pin J' at one end and its other end is pivoted to a pin or screw $J^3$ which is fastened to the guide bar $S^2$.

The cut off valve W which is mounted within the casing G, and which valve is similar in construction to the one illustrated in Fig. 5 of the drawings, has a stem W' to which a crank $W^2$ is fixed and a rod $W^3$ is pivotally connected to the pin carried by the crank $W^2$ and also to a pivot pin V which is fastened to the guide bar O.

The parts of my improved meter apparatus being arranged in the manner described its operation is as follows:—The pressure of water, gas or other fluid in the service or supply pipe K will cause the pistons within the cylinder to move in one direction or the other, and the guide bars fixed to the stems of the pistons will through their pivotal connections with the cranks J and $W^2$ cause the cut off valves to rock. Assumed that the cut off valves, and pistons are in the positions illustrated in Fig. 3 of the drawings. When in these positions the fluid in the service pipe is allowed to enter the duct in the cut off valve N and enter the port E' in the inner end of the compartment in which the piston C is mounted and exert pressure upon the latter, and move the same to its farthest outer limit. In the position shown in Fig. 3 of the drawings the cut off valve N will allow the outer end of the compartment, in which the piston C is located, to exhaust, or discharge through the port E and pipe F'. When the piston is in a position shown in Fig. 3 of the drawings, the valve W, through the connections shown, will have been rocked so that the duct G' leading to the inner end of the compartment in which the piston D is located, will communicate with the service pipe K and in which position of valve W, the outer end of the same compartment will be in communication through a port H' with the discharge or exhaust pipe I. It will be noted that when the pistons are in the positions shown in Fig. 3 of the drawings, the operative parts of the apparatus will be positioned as shown in Fig. 1 of the drawings, in which the disk cranks will by the connections shown, be prevented from dead centers. It will be noted that the two disk cranks will have adjustments as well as the guide bars upon the piston stems, in order to regulate the working of the meter. After the piston C has reached its farthest outer limit, valve N will then be thrown into position to admit fluid pressure behind the piston D, then moving the latter to the right and exhausting through the port H' and pipe I. This operation continues until the piston D assumes the same relative position that the piston C now assumes, when the valve in casing F will be thrown into a position to admit fluid through the port E and move the piston C to the right.

From the foregoing it will be noted that in the operation of the apparatus, as shown and described, the two pistons work in alternate relation, as do also the cut off valves, each piston stem being adapted to operate a disk crank, thereby causing a continuous registering of the meter when in use.

By the construction of the meter embodying the features of my invention, it has been found that the apparatus will clear itself of all foreign matter and, register accurately at a minimum pressure.

What I claim to be new is:—

1. A gas and water meter comprising a cylinder with apertures in the ends thereof and having a plurality of compartments, a piston in each compartment having a stem movable through the aperture in the respective end of the cylinder, valve casings each having ports communicating with the respective compartment of the cylinder, a discharge pipe communicating with said casings, a cut off valve in each casing, a meter register, a crank arm fixed to each cut off valve, a guide bar fixed to each piston stem and connections between said guide bars and crank arms, a rotatable register operating mechanism, pivotal rods connecting the latter and said guide bars, as set forth.

2. A gas and water meter comprising a cylinder with apertures in the ends thereof and having a plurality of compartments, a piston in each compartment having a stem movable through the aperture in the respective end of the cylinder, valve casings each having ports communicating with the respective compartment of the cylinder, a discharge pipe communicating with said casings, a cut off valve in each casing, a meter register, a crank arm fixed to each cut off valve, a guide bar fixed to each piston stem and connections between said guide bars and crank arms, each guide bar having an aperture therein, a fixed rod passing through said apertures and adapted to guide the bars, rotatable register operating mechanism, and pivotal rod connections between the latter and said guide bars, as set forth.

3. A gas and water meter comprising a cylinder with apertures in the ends thereof and having a plurality of compartments, a piston in each compartment having a stem movable through the aperture in the respective end of the cylinder, valve casings each having ports communicating with the respective compartment of the cylinder, a discharge pipe communicating with said casings, a cut off valve in each casing, a meter register, rotatable mechanism for actuating said register, connections between said cut off valves and piston stems, and connections between the piston stems and said rotatable register mechanism, as set forth.

4. A gas and water meter comprising a cylinder with apertures in the ends thereof and having a plurality of compartments, a piston in each compartment provided with a stem movable through the aperture in the respective end of the cylinder, valve casings each having ports communicating with the respective compartment of the cylinder, a discharge pipe communicating with said casings, a cut-off valve in each casing, a meter register, rotatable disk cranks, connections between the cut-off valves, piston stems and rotatable disk cranks, and a projection upon each of the disk cranks adapted to actuate the register.

5. A gas and water meter comprising a cylinder with apertures in the ends thereof and having a plurality of compartments, a piston in each compartment having a stem movable through the aperture in the respective end of the cylinder, valve casings each having ports communicating with the respective compartment of the cylinder, a discharge pipe communicating with said casings, a cut off valve in each casing, a meter register, an apertured projection upon the cylinder, a screw mounted in the aperture in said projection, disk cranks mounted upon said screw and having relative adjustments, a guide bar fixed to each piston stem, a pivotal rod connection between each guide bar and disk crank, means connecting the guide bars with the cut-off valves and means upon one of said disk cranks adapted to impart intermittent movements to the register, as set forth.

6. A gas and water meter comprising a cylinder with apertures in the ends thereof and having a plurality of compartments, a piston in each compartment having a stem movable through the aperture in the respective end of the cylinder, valve casings each having ports communicating with the respective compartment of the cylinder, a discharge pipe communicating with said casings, a cut off valve in each casing, a meter register, an apertured projection upon the cylinder, a screw mounted in the aperture in said projection, disk cranks mounted upon said screw and having relative adjustments, one of said disks having a cylindrical outlined recess, a ring in said recess and in which the screw is journaled, a guide bar fixed to each piston stem, a pivotal rod connection between each guide bar and disk crank, and a pivotal rod and crank connection between each guide bar and each cut off valve, as set forth.

In testimony whereof I hereunto affix my signature in the presence of two witnesses.

JAMES J. MULHALL.

Witnesses:
PHILIP DURAND,
A. L. HOUGH.

Copies of this patent may be obtained for five cents each, by addressing the "Commissioner of Patents, Washington, D. C."